United States Patent [19]

Whang et al.

[11] 4,101,709

[45] Jul. 18, 1978

[54] LOW MODULES GLASS FIBERS AND LAMINATE REINFORCED WITH SAME

[75] Inventors: Tack J. Whang, Berea; Robert W. Pelz, West Richfield, both of Ohio

[73] Assignee: Reichhold Chemicals, Inc., White Plains, N.Y.

[21] Appl. No.: 354,423

[22] Filed: Apr. 25, 1973

Related U.S. Application Data

[63] Continuation-in-part of Ser. No. 151,990, Jun. 10, 1971, abandoned, which is a continuation of Ser. No. 40,331, May 25, 1970, abandoned, which is a continuation-in-part of Ser. No. 723,780, Apr. 24, 1968, abandoned.

[51] Int. Cl.$^2$ .................. B32B 15/00; B32B 17/06
[52] U.S. Cl. .................. 428/433; 428/242; 428/325; 428/426; 428/428; 428/430; 428/446; 428/454; 428/539
[58] Field of Search ........................ 106/50, 106/53, 54; 161/194, 185, 404, 140, 168, 169, 170, 156; 428/210, 325, 454, 242, 280, 285, 539, 446, 426, 428, 430, 433

[56] References Cited

U.S. PATENT DOCUMENTS

| | | | |
|---|---|---|---|
| 1,449,793 | 3/1923 | Taylor | 106/53 X |
| 2,513,958 | 7/1950 | Omley | 106/53 |
| 2,960,424 | 11/1960 | Bjorholm | 161/404 X |
| 3,310,457 | 3/1967 | Trebilcock | 161/185 |
| 3,416,990 | 12/1968 | Robinson | 161/156 X |
| 3,440,132 | 4/1969 | Koubek | 161/156 |
| 3,691,000 | 9/1972 | Kalnin | 161/170 |

FOREIGN PATENT DOCUMENTS

| | | | |
|---|---|---|---|
| 1,072,367 | 12/1959 | Fed. Rep. of Germany | 106/50 |
| 194,785 | 4/1967 | U.S.S.R. | 106/50 |

*Primary Examiner*—Lorraine T. Kendell

[57] ABSTRACT

Improved, low modulus glass fibers for the production of glass fiber reinforced, high energy absorption resin laminates, said glass having a modulus of elasticity of from about 5.0 to about 6.5 × 10$^6$ psi, the composition of said fibers being generally of the alkali borosilicate type, the major portion thereof comprising from about 40–65 weight percent $SiO_2$, 24–38 weight percent $B_2O_3$, and 5–20 weight percent alkali.

A high energy absorption resin laminate comprising the combination of a plastic resin composition reinforced with said fibers.

17 Claims, 1 Drawing Figure

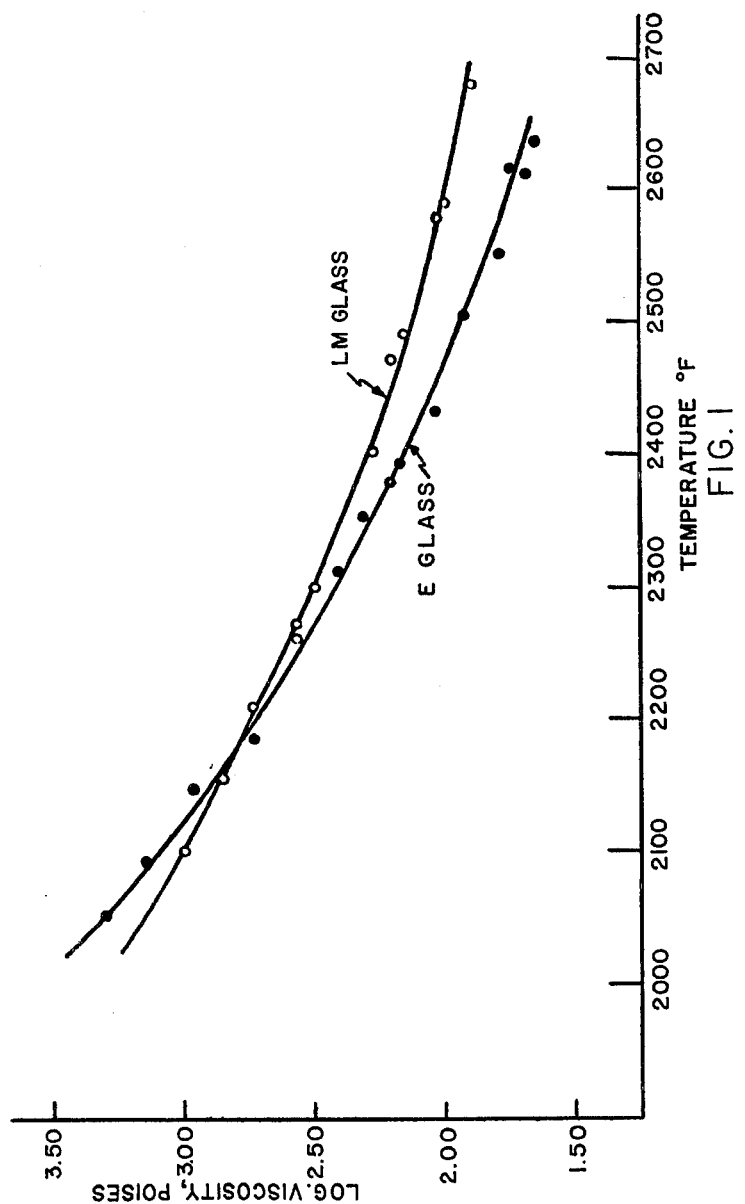

LOW MODULES GLASS FIBERS AND LAMINATE REINFORCED WITH SAME

This is a continuation-in-part of Ser. No. 151,990 filed June 10, 1971, and now abandoned, which is a continuation of application Ser. No. 40,331 filed May 25, 1970, and now abandoned, which in turn is a continuation-in-part of application Ser. No. 723,780 filed Apr. 24, 1968 and now abandoned.

BACKGROUND OF INVENTION

1. Field of the Invention

Generally the field of this invention encompasses fiberglass reinforcement composed of the glass of this invention, which is a relatively low modulus of elasticity glass for new fiberglass applications we believe to be heretofore unknown.

One of the primary areas of utility for the material of this invention being to present a flexible, secondary high energy absorption mass for body armor.

Another application for this type material as utilized in a resin laminate may be for the manufacture of springs. Modulus of resilience is inversely proportional to elastic modulus, hence the lower the elastic modulus, the higher the resilience modulus, permitting a much softer response and lower frequency response to deflection than heretofore possible with thermosetting, fiberglass reinforced laminates reinforced with, for example, conventional "E" glass having a relatively high elastic modulus on the order of $10.5 \times 10^6$ psi.

Another area of possible use of this glass is for automotive tire cords.

2. Description of the Prior Art

The prior art is replete with thousands of patent publications dealing with the fiberglass art generally, wherein various thermosetting plastic resins, such as epoxy and polyester, are formed into such shapes as liquid storage tanks, boat hulls, various and sundry machinery and appliance parts, in combination with fiberglass reinforcement, usually of well-known "E" glass in the form of chopped strand, chopped strand mat, woven roving, or woven strand, to mention a few, whereby the glass filaments lend "muscle" and rigidity to the fiberglass reinforced article.

High modulus glasses are normally used to impart the maximum degree of strength and rigidity to the laminate to adapt it to the various rigorous and demanding stresses it would normally be subjected to.

Consequently, little thought has been given to deliberately investigating the area of low modulus glasses because springyness, resilience and low modulus were not only undesirable for normal uses, there were many reasons why it was felt that a low modulus glass would simply not lend itself to being drawn into filaments, an essential quality if a glass is going to be used as a reinforcing agent in a plastic laminate.

For one thing, the glasses of this invention, as is true of any fiberizable glass, should have relative freedom from crystallization in or near the vicinity of the drawing range, since crystallization occurring during drawing tends to break filaments and make for discontinuity in the strand manufacture. Quite surprisingly, we have found that the preferred glasses of this invention develop literally no liquidus temperature (threshold of crystallization) utilizing a standard test for a normal length of time.

For example, the following test is utilized for determining the liquidus, or crystallization temperature.

A platinum boat, approximately 5 inches long, is filled with a pulverized sample of the glass to be tested, the boat is placed in a conventional recording, temperature gradient furnace and allowed to stabilize substantially at the gradient ambient of the furnace for about a minimum of 15 hours following which the boat is rapidly removed from this furnace and permitted to quickly "freeze," in a matter of seconds at room temperature thereby quickly fixing the glass, so to speak, at whatever crystalline or amorphous state existed in each incremental temperature gradient section of the sample while in the furnace.

When so tested, standard "E" glass will crystallize in a matter of minutes. However, any of the preferred glasses of this invention when so tested, and left at any temperature for at least 48 hours, showed no sign of crystallization.

Another reason why low modulus glasses have never been seriously considered for commercial applications is that the normal expectation is that a low modulus glass will also have a correspondingly low tensile strength, so low, in fact, that it lacks sufficient strength to be drawn from a bushing and fiberized.

However, the low modulus formulations of the glasses of this invention, as will be noted hereinafter in the disclosure, retain a surprisingly high degree of tensile strength permitting them to be readily and quickly drawn from commercial bushings.

Finally, the viscosity curve of the glasses of this invention, as exemplified by the curve of FIG. 1, is much flatter than the viscosity curve of "E" glass for example which also makes for much more trouble-free drawing from a commercial bushing.

This flat viscosity curve allows for a wide temperature range through which fibers can be continuously drawn. A single glass composition of this invention has been found to have a drawing temperature range of over 700° F. e.g. in the attached Table II glass No. 5 was drawn at temperatures from about 1800° to about 2500° F.

SUMMARY OF THE INVENTION

Summarizing, the glass of this invention is a relatively low modulus glass which finds its utility in its low modulus of elasticity with correspondingly high modulus of resilience, said glass having unexpected features which permit it to be commercially drawn into filaments at high speeds from platinum bushings without breakage due to unexpectedly high tensile strength, notwithstanding its low elastic modulus, as well as a relatively flat viscosity curve and freedom from crystallization, which permits wide variation in drawing temperatures and speeds, without fear of frequent filament breaks which tend to disrupt production.

DESCRIPTION OF THE DRAWING

The attached drawing plots the viscosity curve of the glasses of this invention designated "LM" for "low modulus," as compared to a standard "E" glass.

DESCRIPTION OF PREFERRED EMBODIMENT

Using well-known, basic glass melting equipment, the raw batch compositions set forth below in Table I were batch weighed, which were then thoroughly mixed and charged into a crucible and melted into a glass at the indicated temperature shown in Table I. The resultant glass was poured into a slab mold, cooled and broken up. Following this the glass was charged into a bushing controlled at the temperature shown in Table II, fiberized and formed into strand.

Utilizing conventional methods and apparatus well known in the art, the glass strand having the composi-

TABLE 1

(Batch Compositions)

| No. | 1 | 2 | 3 | 4 | 5 | 6 | 7 | 8 | 9 |
|---|---|---|---|---|---|---|---|---|---|
| Silica (325 mesh) | 138.0 | 132.0 | 138.0 | 138.0 | 161.1 | 129.0 | 132.0 | 132.0 | 130.0 |
| Boric Acid | 133.5 | 133.5 | 133.5 | 111.0 | 159.7 | 128.0 | 111.0 | 111.0 | 129.0 |
| Potassium Carbonate | 18.5 | 27.8 | 11.1 | 18.5 | 28.8 | 22.3 | 27.8 | 18.5 | 22.3 |
| Red Lead | 12.5 | 12.5 | 12.5 | 25.0 | 16.3 | 12.5 | 18.5 | 23.0 | 12.5 |
| Calcined Alumina | 12.6 | 12.6 | 12.6 | 12.6 | 15.0 | 12.6 | 12.6 | 12.6 | 12.6 |
| Sodium Silico Fluoride | | | | | 8.3 | 7.0 | 7.0 | 5.0 | 6.2 |
| Salt Cake | | | | | 6.3 | | | | |
| Soda Ash | | | 8.6 | | | | | | 1.0 |
| Titanium Oxide | | | | | | 4.0 | | 4.0 | |
| Lime | | | | | | | | | |
| Melting Temp. °F. | 2400 | 2800 | 2800 | 2800 | 2700 | 2700 | 2700 | 2700 | 2700 |
| No. | 10 | 11 | 12 | 13 | 14 | 15 | 16 | 17 | 18 |
| Silica (325 Mesh) | 130.0 | 129.0 | 100.5 | 100.5 | 113.0 | 125.7 | 163.3 | 136.0 | 102.8 |
| Boric Acid | 122.2 | 133.0 | 133.5 | 133.5 | 133.5 | 133.5 | 133.5 | 257.0 | 135.7 |
| Potassium Carbonate | 27.8 | 22.3 | 37.0 | 74.0 | 55.5 | 37.0 | 18.5 | | 5.6 |
| Red Lead | 12.5 | 12.5 | 37.5 | 12.5 | 12.5 | 12.5 | | | 42.5 |
| Calcined Alumina | 12.6 | 12.6 | 12.6 | 12.6 | 12.6 | 12.6 | | | 17.7 |
| Sodium Silico Fluoride | 6.2 | 4.1 | | | | | | | |
| Salt Cake | | | | | | | | | |
| Soda Ash | 1.0 | 1.0 | | | | | | 33.0 | 8.6 |
| Titanium Oxide | | | | | | | | | |
| Lime | | | | | | | | | 4.5 |
| Melting Temp. °F. | 2700 | 2700 | 2400 | 2400 | 2800 | 2800 | 2500 | 2400 | 2750 |

Set forth below in Table II are the calculated oxide glass composition of this invention corresponding to the raw batch formulations set forth in Table I above.

tion of this invention may be formed into roving, and subsequently formed into chopped strand, chopped strand mat, woven roving, or other known forms of

TABLE II (Oxide Compositions-Weight Percent)

| No. | 1 | 2 | 3 | 4 | 5 | 6 | 7 | 8 | 9 |
|---|---|---|---|---|---|---|---|---|---|
| $SiO_2$ | 55.0 | 52.7 | 55.0 | 55.0 | 52.0 | 51.5 | 52.7 | 52.7 | 52.5 |
| $B_2O_3$ | 30.0 | 30.0 | 30.0 | 25.0 | 28.7 | 28.4 | 24.6 | 24.7 | 29.0 |
| $K_2O$ | 5.0 | 7.5 | 3.0 | 5.0 | 6.0 | 6.0 | 7.5 | 5.0 | 6.0 |
| $Na_2O$ | | | 2.0 | | 1.7 | 1.0 | 1.0 | .7 | 1.0 |
| PbO | 5.0 | 5.0 | 5.0 | 10.0 | 5.0 | 5.0 | 7.5 | 9.1 | 5.0 |
| $Al_2O_3$ | 5.0 | 5.0 | 5.0 | 5.0 | 5.0 | 5.0 | 5.0 | 5.0 | 5.0 |
| $TiO_2$ | | | | | | 1.6 | | 1.6 | |
| $F_2$ | | | | | 1.6 | 1.6 | 1.6 | 1.2 | 1.5 |
| CaO | | | | | | | | | |
| Modulas of elasticity × $10^6$ psi | 5.36 | 5.34 | 5.47 | 5.37 | 5.35 | 5.37 | 5.49 | 5.57 | 5.18 |
| Tensile Strength × $10^3$ psi | 181 | 261 | 229 | 242 | 260 | 256 | 268 | 265 | 261 |
| Density g/cc | 2.21 | 2.24 | 2.23 | 2.35 | 2.24 | 2.25 | 2.36 | 2.34 | 2.23 |
| Draw. Temp. °F. | 2750 | 2500 | 2660 | 2675 | 2450 | 2470 | 2365 | 2510° F. | 2460 |
| No. | 10 | 11 | 12 | 13 | 14 | 15 | 16 | 17 | 18 |
| $SiO_2$ | 52.5 | 52.0 | 40.0 | 40.0 | 45.0 | 50.0 | 65.0 | 54.0 | 41.0 |
| $B_2O_3$ | 27.5 | 30.0 | 30.0 | 30.0 | 30.0 | 30.0 | 30.0 | 38.0 | 30.5 |
| $K_2O$ | 7.5 | 6.0 | 10.0 | 20.0 | 15.0 | 10.0 | 5.0 | | 1.5 |
| $Na_2O$ | 1.0 | 1.0 | | | | | | 8. | 2.0 |
| PbO | 5.0 | 5.0 | 15.0 | 5.0 | 5.0 | 5.0 | | | 17.0 |
| $Al_2O_3$ | 5.0 | 5.0 | 5.0 | 5.0 | 5.0 | 5.0 | | | 7.0 |
| $TiO_2$ | | | | | | | | | |
| $F_2$ | 1.5 | 1.0 | | | | | | | |
| CaO | | | | | | | | | 1.0 |
| Modulas of Elasticity × $10^6$ psi | 5.65 | 5.45 | 6.25 | 6.21 | 6.24 | 6.11 | 6.22 | 6.28 | 6.00 |
| Tensile Strength × $10^3$ psi | 250 | 238 | 213 | 261 | 228 | 242 | 248 | 212 | 264 |
| Density g/cc | 2.25 | 2.23 | 2.53 | 2.40 | 2.35 | 2.29 | 2.15 | 2.23 | 2.54 |
| Draw. Temp. °F. | 2385 | 2425 | 1925 | 1845 | 2130 | 2295 | 2425 | 1965 | 2175 |

Although $Li_2O$ may be included with the alkalies it tends to raise the modulus, and should normally be held at a maximum of 2.0 weight percent.

fiberglass reinforcement, and further utilizing well-known thermosetting resins, such as epoxy and polyester, a formed laminate may be produced which is far superior for realizing the utility of this invention, than similar laminates produced using conventional "E", or so-called high strength glass compositions having high moduli of elasticity.

Primary utilization of the fiberglass of this invention is to reinforce plastic resin laminate body armor backup, particularly as a backup to light weight ceramic armor, said armor actually being a composite material consisting of a facing of a high modulus ceramic material, usually alumina, silicon carbide or boron carbide, and a backing consisting of a low modulus fiberglass reinforced polyester.

In operation, the ceramic facing is the primary energy absorbent which, is absorbing the energy of a speeding projectile, shatters under the impact thereof. The backing material, reinforced with the glass of this invention, having a much lower modulus, hence much greater resiliency, is capable of catching and effectively stopping the nearly spent projectile before it has an opportunity to penetrate the total composite. Generally, other factors remaining equal, the lower the modulus of the glass reinforcement, the higher will be its capability of effectively catching and stopping a partially spent projectile thereby preventing penetration.

These glasses, as reinforcement for resin laminates, would be adaptable to fatigue resistant applications, including vibration damping, vibratory conveying, springs, etc. Too, this ability to absorb shock would render them particularly useful as woven fabric for such applications as sail cloth, industrial belting, parachutes, etc.

It is theorized, that a factor in the reduction in cyclic fatigue resistance of fiberglass composites is quite likely the substantial difference between the modulus of elasticity of the resins and that of the reinforcing glass. With the glasses of this invention, the imbalance of elasticity moduli between the resin and the reinforcing glass would be markedly reduced, thereby as a consequence, improving fatigue resistance.

As will be apparent from the foregoing oxide compositions of Table II, the preferred range of composition for the glass fibers of this invention is set forth below in Table III:

TABLE III

|  | Wt.% |
|---|---|
| $SiO_2$ | 40–65 |
| $B_2O_3$ | 24–38 |
| $Na_2O + K_2O$ | 5–20 |
| $PbO$ | 0–17 |
| $CaO$ | 0–2 |
| $Al_2O_3$ | 0–7 |
| $Fe_2O_3$ | 0–2 |
| $TiO_2$ | 0–3 |
| $F_2$ | 0–2 |

The foregoing components totalling 100 as they vary within the ranges indicated.

Generally the base composition of these glasses is to be found in the system $SiO_2$-$B_2O_3$-$Na_2O$/$K_2O$-$PbO$-$Al_2O_3$, or $SiO_2$-$B_2O_3$-$Na_2O$/$K_2O$. It is to be understood that many modifying oxides may be included, such as, although not limited to those in Table II, for purposes other than altering the modulus of elasticity. For example, as is known in the glass art, such oxides may be added for the purpose of improving durability or liquidus, coefficient of expansion, or forming viscosity.

Fiber specimens for tensile strength were hand gathered by cutting fibers of 30 to 40 inches long between bushing orifice and fiber drawing winder while the fiber was being drawn. The specimens were then wound on a U-shaped sheet metal holder and cemented in place for ease of handling. Each holder furnished eight specimens for tensile testing. Prior to test, the fiber specimens were conditioned by storing them in a desiccator for two hours.

The apparatus for measuring tensile strength was a materials testing device consisting essentially of a strain gauge type load cell with fiber holding fixtures, a strain gauge amplifier and a recorder. The fibers were loaded (at a constant rate of strain) by a screw-driven crosshead, to which the load cell was attached.

The cross sectional area of a single fiber was calculated from the diameter of the fiber as determined under a microscope by means of a filar eyepiece.

Tensile strengths of the glass fibers were calculated from the load required to break the fiber divided by the cross sectional area of the fiber. The loading was accomplished by pulling the fiber at a constant strain rate of 0.1 in./in./min. at a gauge length of one inch.

The moduli of elasticity of nascent fibers were determined from the stress-strain curve on the recorder mentioned above. The modulus specimens were loaded at a constant rate of strain of 0.1 in./in./min. at a gauge length of 20 inches.

The specimens for modulus determination were gathered in the same manner described above except that they were not mounted on the sample holder. These samples were mounted directly in the materials testing unit and tested immediately without conditioning.

Of the examples set forth in Tables I and II above, 1–5, 7, and 9–11 represent preferred compositions.

As stated above, all the well-known techniques of the fiberglass art, from the standpoint of workable thermosetting and thermoplastic resins or elastomers, size compositions, etc., are applicable to the fibers of this invention. And, as used herein, "resins" is inclusive of any of the synthetic polymers used and known in the art, for forming fiberglass reinforced composites or laminates.

Exemplary of but a few, would be the resins, size compositions and general techniques disclosed in such U.S. patents as the following: U.S. Pat. Nos. 2,477,407, 2,546,230, 2,625,498, 2,938,737, 2,975,503, 3,054,714, 3,158,519, 3,340,083, 3,437,517. Thus, for example, using any one of the well-known epoxy resins disclosed, and conventional molding techniques, a body armor or armor plate backup section may be fabricated, containing an optimum of 70 to 80 weight percent, based upon the total weight of the laminate, of the fiberglass reinforcement of this invention, with the practical maximum of glass fiber reinforcement being in the area of about 85 weight percent, the minimum being in the area of 40 to 50 weight percent.

In a test example, the glass of this invention was compared with standard "E" glass, in a standard polyester laminate reinforced with about 75 weight percent of glass fibers, utilizing the dynamic testing procedures set forth in Appendix B of the "Third Progress Report of Light Armor Program" by Mark L. Wilkins, No. UCRL-50460, dated July 9, 1968, published by the Lawrence Radiation Laboratory of the University of California at Livermore, Calif. At a ram velocity of from 0.57 to 570 miles per hour, the glass of this invention, in absorbing shock energy and reducing penetration, provided load values on the order of from 2,000 to 3,000 lbs. greater than "E" glass, utilizing composite test panels approximately a quarter of an inch thick, and a ram 0.6 inch diameter.

Expressed in terms of improvement in ballistic performance, utilizing .22 caliber, 17 grain fragment simulating projectiles, following the procedure as outlined in "Summary of Terminal Ballistic Data on Light Weight Armor Materials" by Francis S. Mascianica published by the Army Mechanics and Materials Research Center (Tr69-17), July, 1969, at pages 1–7, the improvement of the glass of this invention over "E" glass, at 0° obliquity, ranged from about 20 to about 30% higher, over an areal density range, expressed as lbs./ft.$^2$, of from about 1.0 to about 3.5.

The essence of the novelty of this invention is the conception of the desirability and utility of a low modulus glass fiber to provide a certain amount of yieldability, sacrificial if need be, to a laminate for energy absorption purposes, coupled with the discovery that the glass of this invention provided the required modulus.

Thus, the novelty of this glass residing primarily in an internal, physical characteristic, its outward appearance and surface characteristics being analogous to any conventional fiberglass reinforcement, prior resins, techniques and processes would expectedly be compatible with this glass for the purpose of forming it into a laminate.

Using any conventional means, the fiberglass reinforced resin laminate could be affixed, as a backup layer, to a high density alumina base plate designed to shatter upon initial impact of a projectile, permitting it to spend the remainder of its energy in the relatively resilient, low modulus backup section of this invention.

In like manner, springs may be fabricated from the glass of this invention, as well as various fabrics subjected to sudden physical shock, such as sail or parachute cloth, industrial belting, etc.

Although the composition of this glass may have been generally known, and its general composition has been fiberized as a transient, temporary step for chemically leaching all its soluble components to reduce it to predominantly quartz, as taught in German Pat. No. 1,072,367 to Kuhne, no one has suggested that there was any utility, much less the highly specialized utility of this invention, in the unaltered fibers of this invention as a final end product, or work product.

Kuhne's fibers, essentially, were a step, a reactant so to speak, in a process of physical chemistry; Kuhne considering his fibers, in the form they contained anything additional to quartz, valueless except as a suitable medium for carrying out a chemical reaction to completely alter their composition.

And by "end product" or "work product" as used herein, is meant the fibers of this invention as processed into a woven or felted mat or fabric, either for laminate reinforcement, or textile application, wherein said fibers substantially retain both their chemical composition, as well as their individual identity as fibers. This definition thereby excludes interim compositions or forms of glass in process, such as molten glass, or glass fibers in bulk for subsequent chemical processing to achieve a substantially different composition.

While the alkalies $Na_2O$ and $K_2O$ are preferred, a small amount of $Li_2O$, 2 weight percent or lower, may be tolerated. Above this level, it tends to up the modulus of elasticity.

Having thus described and illustrated our invention, it is set forth in the following claims which are to be construed in the light of the United States statutes and decisions in such a manner as to give them the broad range of equivalents to which they are entitled.

We claim:

1. A fiberglass reinforced resin laminate containing and reinforced with from about 40 to about 85 weight percent, based on the weight of the laminate, of a low modulus glass fiber work product, said glass having a modulus of elasticity of from about 5.0 to about 6.5 × 10$^6$ psi.

2. A fiberglass reinforced thermoset resin laminate containing and reinforced with from about 40 to about 85 weight percent, based on the weight of the laminate, of a low modulus glass fiber reinforcement having the following composition:

|  | Wt.% |
|---|---|
| $SiO_2$ | 40–65 |
| $B_2O_3$ | 24–38 |
| $Na_2O + K_2O$ | 5–20 |
| $Li_2O$ | 0–2 |
| PbO | 0–17 |
| CaO | 0–2 |
| $Al_2O_3$ | 0–7 |
| $Fe_2O_3$ | 0–2 |
| $TiO_2$ | 0–3 |
| $F_2$ | 0–2 | wherein, when $Al_2O_3$ is present, PbO is present, and the ratio of PbO:$Al_2O_3$ is from about 1:1 to about 3:1, and, when PbO is absent, so are all constituents other than $SiO_2$, $B_2O_3$ and $Na_2O/K_2O$, the parts by weight of the foregoing components totalling 100 as they vary within the indicated ranges respectively, said glass having a modulus of elasticity of from about 5.0 to about 6.5 × 10$^6$ psi, said glass present in said laminate substantially as chemically constituted when fiberized.

3. The laminate of claim 2 wherein said glass has a tensile strength of from about 181 to about 268 × 10$^3$ psi.

4. The laminate of claim 2 wherein said glass has a tensile strength of from about 181 to about 268 × 10$^3$ psi, and a drawing temperature of from about 1500° to about 2500° F.

5. The laminate of claim 2 wherein said glass has a tensile strength of from about 181 to about 268 × 10$^3$ psi, and a drawing temperature of from about 1845° to about 2750° F.

6. A fiberglass reinforced thermoset resin laminate containing and reinforced with from about 40 to about 85 weight percent, based on the weight of the laminate, of a low modulus glass fiber reinforcement having the following composition:

|  | Wt.% |
|---|---|
| $SiO_2$ | 40–65 |
| $B_2O_3$ | 24–38 |
| $Na_2O + K_2O$ | 5–20 |
| $Li_2O$ | 0–2 |
| PbO | 0–17 |
| CaO | 0–2 |
| $Al_2O_3$ | 0–7 |
| $Fe_2O_3$ | 0–2 |
| $TiO_2$ | 0–3 |
| $F_2$ | 0–2 | said glass including at least one of the systems selected from the group consisting of $SiO_2$-$B_2O_3$-$Na_2O/K_2O$-PbO-$Al_2O_3$ and $SiO_2$-$B_2O_3$-$Na_2O/K_2O$, wherein, when $Al_2O_3$ is present, PbO is present, and the ratio of PbO:$Al_2O_3$ is from about 1:1 to about 3:1, and, when PbO is absent, so are all constituents other than $SiO_2$, $B_2O_3$ and $Na_2O/K_2O$, the parts by weight of the foregoing components totalling 100 as they vary within the indicated ranges respectively, said glass having a modulus of elasticity of from about 5.0 to about 6.5 × $10^6$ psi, said glass present in said laminate substantially as chemically constituted when fiberized.

7. The laminate of claim 6 wherein said glass has a tensile strength of from about 181 to about 268 × $10^3$ psi.

8. The laminate of claim 6 wherein said glass has a tensile strength of from about 181 to about 268 × $10^3$ psi, and a drawing temperature of from about 1500° to about 2500° F.

9. The laminate of claim 6 wherein said glass has a tensile strength of from about 181 to about 268 × $10^3$ psi, and a drawing temperature of from about 1845° to about 2750° F.

10. In combination, a layer of fiberglass reinforced thermoset resin laminate containing and reinforced with from about 40 to about 85 weight percent, based on the weight of the laminate, of a low modulus glass fiber reinforcement, said glass having the following composition:

|  | Wt.% |
|---|---|
| $SiO_2$ | 40–65 |
| $B_2O_3$ | 24–38 |
| $Na_2O + K_2O$ | 5–20 |
| $Li_2O$ | 0–2 |
| PbO | 0–17 |
| CaO | 0–2 |
| $Al_2O_3$ | 0–7 |
| $Fe_2O_3$ | 0–2 |
| $TiO_2$ | 0–3 |
| $F_2$ | 0–2 | said glass including at least one of the systems selected from the group consisting of $SiO_2$-$B_2O_3$-$Na_2O$/$K_2O$-PbO-$Al_2O_3$ and $SiO_2$-$B_2O_3$-$Na_2O$/$K_2O$, wherein, when $Al_2O_3$ is present, PbO is present, and the ratio of PbO:$Al_2O_3$ is from about 1:1 to about 3:1, and, when PbO is absent, so are all constituents other than $SiO_2$, $B_2O_3$ and $Na_2O$/$K_2O$, the parts by weight of the foregoing components totalling 100 as they vary within the indicated ranges respectively, said glass having a modulus of elasticity of from about 5.0 to about 6.5 × $10^6$ psi, with a layer of fired ceramic, said glass present in said laminate substantially as chemically constituted when fiberized.

11. The combination of claim 10 wherein said glass has a tensile strength of from about 181 to about 268 × $10^3$ psi.

12. The combination of claim 10 wherein said glass has a tensile strength of from about 181 to about 268 × $10^3$ psi, and a drawing temperature of from about 1500° to about 2500° F.

13. The combination of claim 10 wherein said glass has a tensile strength of from about 181 to about 268 × $10^3$ psi, and a drawing temperature of from about 1845° to about 2750° F.

14. In combination, a layer of fiberglass reinforced thermoset resin laminate containing and reinforced with from about 40 to about 85 weight percent, based on the weight of the laminate, of a low modulus glass fiber reinforcement, said glass having the following composition:

|  | Wt.% |
|---|---|
| $SiO_2$ | 40–65 |
| $B_2O_3$ | 24–38 |
| $Na_2O + K_2O$ | 5–20 |
| $Li_2O$ | 0–2 |
| PbO | 0–17 |
| CaO | 0–2 |
| $Al_2O_3$ | 0–7 |
| $Fe_2O_3$ | 0–2 |
| $TiO_2$ | 0–3 |
| $F_2$ | 0–2 | wherein, when $Al_2O_3$ is present PbO is present, and the ratio of PbO:$Al_2O_3$ is from about 1:1 to about 3:1, and, when PbO is absent, so are all constituents other than $SiO_2$, $B_2O_3$ and $Na_2O$/$K_2O$, the parts by weight of the foregoing components totalling 100 as they vary within the indicated ranges respectively, said glass having a modulus of elasticity of from about 5.0 to about 6.5 × $10^6$ psi, with a layer of fired ceramic, said glass present in said laminate substantially as chemically constituted when fiberized.

15. The combination of claim 14 wherein said glass has a tensile strength of from about 181 to about 268 × $10^3$ psi.

16. The combination of claim 14 wherein said glass has a tensile strength of from about 181 to about 268 × $10^3$ psi, and a drawing temperature of from about 1500° to about 2500° F.

17. The combination of claim 14 wherein said glass has a tensile strength of from about 181 to about 268 × $10^3$ psi, and a drawing temperature of from about 1845° to about 2750° F.

* * * * *